United States Patent [19]

Hiro et al.

[11] Patent Number: 5,351,493
[45] Date of Patent: Oct. 4, 1994

[54] THERMALLY DRIVEN REFRIGERATION SYSTEM UTILIZING METAL HYDRIDES

[75] Inventors: Naoki Hiro, Osaka; Masato Osumi, Moriguchi, both of Japan

[73] Assignee: Sanyo Electric Co., Ltd., Moriguchi, Japan

[21] Appl. No.: 986,744

[22] Filed: Dec. 8, 1992

[30] Foreign Application Priority Data

Dec. 10, 1991 [JP] Japan .................. 3-349842
Dec. 25, 1991 [JP] Japan .................. 3-356514

[51] Int. Cl.⁵ .................. F25B 17/12; F17C 7/00; F25D 21/00
[52] U.S. Cl. .................. 62/46.2; 62/467; 62/480; 165/104.12
[58] Field of Search .................. 62/46.2, 467, 480; 165/104.12

[56] References Cited

U.S. PATENT DOCUMENTS

| | | | |
|---|---|---|---|
| 4,185,979 | 1/1980 | Woolley | 62/46.2 |
| 4,402,915 | 9/1983 | Nishizaki et al. | 62/46.2 X |
| 4,409,799 | 10/1983 | Nishizaki et al. | 62/46.2 X |
| 4,523,635 | 6/1985 | Nishizaki et al. | 165/104.12 |
| 4,623,018 | 11/1986 | Takeshita et al. | 165/104.12 |
| 5,042,259 | 8/1991 | Jones | 62/46.2 |
| 5,174,367 | 12/1992 | Nasako et al. | 62/46.2 X |

FOREIGN PATENT DOCUMENTS

| | | | |
|---|---|---|---|
| 388132 | 9/1990 | European Pat. Off. | 62/46.2 |
| 1219455 | 9/1989 | Japan | 62/46.2 |
| 1291072 | 11/1989 | Japan | 62/46.2 |
| 1305273 | 12/1989 | Japan | 62/46.2 |
| 2110263 | 4/1990 | Japan | 62/46.2 |
| 2254265 | 10/1990 | Japan | 62/46.2 |
| 2272269 | 11/1990 | Japan | 62/46.2 |
| 2279961 | 11/1990 | Japan | 62/46.2 |

Primary Examiner—Henry A. Bennett
Assistant Examiner—C. Kilner
Attorney, Agent, or Firm—Armstrong, Westerman, Hattori, McLeland & Naughton

[57] ABSTRACT

This system utilizes three kinds of metal hydrides, MH1, MH2, and MH3, having the highest, an intermediate, and the lowest equilibrium hydrogen pressures, respectively, in the order mentioned, each kind of metal hydrides being enclosed in two sets of respective metal-hydride containers. While hydrogen flows from the metal hydride MH3 to the metal hydrides MH2 and MH1 in one set, hydrogen flows from the metal hydrides MH2 and MH1 metal hydride MH3 in other set such that the cold heat generated by hydrogen dissociation from the metal hydride MH2 in said other set is utilized to cool the metal hydride MH1 of said one set for efficient hydrogen absorption by the metal hydride MH1, and the cold heat generated by hydrogen dissociation from the metal hydride MH1 of said other set is provided for refrigeration. The two cycles operations are repeated interchangeablly between the two sets, enabling the system to maintain high operating hydrogen pressures associated with exothermic dissociation of hydrogen and allows continuous provision of cold heat for refrigeration at a temperature lower than conventional temperature.

10 Claims, 8 Drawing Sheets

THERMALLY DRIVEN REFRIGERATION SYSTEM UTILIZING METAL HYDRIDES

FIELD OF THE INVENTION

The invention relates to thermally driven cold heat generating systems utilizing metal hydrides for generating cold heat.

BACKGROUND OF THE INVENTION

Some known metals may repeat exothermic absorption and endothermic desorption (or dissociation) of hydrogen, through hydrogenating the metal and dehydrogenating the metal hydride formed, respectively.

In what follows those metals are referred to as metal hydrides even after they have dissociated the hydrogen and restored metal states.

Systems utilizing metal hydrides for obtaining cold heat and hot heat have been disclosed in, for example, Japanese Patent Publication Sho 68-4111.

However, equilibrium hydrogen pressure during refrigeration becomes too low for such prior art system to serve as a cold heat source at −50° C., since hydrogenation of metals then proceeds very slowly. Also, it is difficult with the prior art systems to efficiently extract cold heat in a controlled manner at an arbitrary temperature in the range of −20° C. and −50° C., say. Furthermore, prior art systems fail to provide desirable cold heat when the temperature of the heat radiator becomes high, since equilibrium hydrogen pressure becomes very high at high temperatures.

SUMMARY OF THE INVENTION

An object of the invention is, therefore, to overcome the drawbacks of prior art cold heat generating systems mentioned above. Specifically, a primary object of the invention is to provide a cold heat generating system utilizing metal hydrides which may efficiently generate desirable cold heat even when the high cooling temperature (i.e. temperature of the heat radiators) of the system becomes high and the efficiency of the heat radiators lowers.

In order to fulfill the above object a cold heat generating system utilizing metal hydrides in accordance with the invention includes a multiplicity of metal hydride containers (which will be referred to simply as containers) each accommodating therein metal hydrides, a hydrogen supply/release tube connected air-tightly with an external hydrogen conduit tube, and a heat exchanger connected air-tightly with an external heat transfer medium transport tube, wherein said multiplicity of metal-hydride containers are provided in two sets such that said heat exchangers in one of the two sets are interchangeablly and alternately connected with external heating portions and cooling portions in a first and a second cycle of refrigeration, respectively, so that in the first cycle hydrogen may be dissociated for liberation of cold heat in one of said sets while the hydrogen is absorbed for recovery in the other set and in the second cycle said absorbed hydrogen is dissociated in the other set for liberation of cold heat while the dissociated hydrogen is absorbed for recovery in said one set, said first and second cycles alternately repeated to thereby continuously provide cold heat, characterized in that each of said two sets of metal hydrides comprises a first, a second, and a third kind of metal hydrides (referred to simply as first, second, and third metal hydrides) having the lowest, an intermediate, and the highest equilibrium hydrogen pressures in the order mentioned, respectively, and accommodated in respective containers, so that in the first cycle said first metal hydride is heated by heat provided from said heating portions for dissociation of hydrogen in one of said two sets and the dissociated hydrogen is absorbed by the second and the third metal [hydrides while at the same time in the other set hydrogen is dissociated from said second and third metal hydrides and the dissociated hydrogen is transferred to the first metal hydride for recovery by said first metal hydride so that cold heat generated by the dissociation of hydrogen from said second metal hydride may be used in cooling the third metal hydride in the one set while the cold heat generated by the third metal hydride in the other set may be utilized for refrigeration. In a second cycle the roles of the first and second sets of the metal hydrides are interchanged. By repeating the first and second cycles alternately, hydrogen pressure during hydrogenation and dehydrogenating processes may be maintained at a high level, thereby promoting absorption/desorption of hydrogen and continuous provision of very cold heat.

The cold heat generating system of the invention is provided with a first through an eighth containers with the first through fourth containers accommodating said first metal hydrides, the fifth and sixth containers accommodating said second metal hydrides, and the seventh and eighth containers accommodating said third metal hydride. The first container is connected with the fifth container by means of a first hydrogen conduit tube having an valve and their supply/release tubes; the second container with the sixth container by means of a second hydrogen conduit tube having an valve and their supply/release tubes; the third container with the seventh container by means of a third hydrogen conduit tube having an valve and their supply/release tubes; and the fourth container with the fifth container by means of a fourth hydrogen conduit tube having an valve and their supply/release tubes. Heat exchangers provided in the first and the third containers are connected in a first cycle, via three-way valves, with a first and a second heating portions and in a second cycle with a first and a second heat radiation portions. Heat exchangers in the containers 2 and 4 are connected in the first cycle, via three-way valves with a first and second heat radiation portions and in the second cycle with the first and the second heating portions. A heat exchanger provided in the fifth container is connected in the first cycle with a third heat radiation portion and in the second cycle with the heat exchanger in the eighth metal-hydride container. A heat exchanger provided in the sixth metal-hydride container is connected in the first cycle with the heat exchanger in the seventh container and and in the second cycle with the heat exchanger of the third heat radiation portion. The heat exchanger provided in the seventh metal-hydride container is connected in the first cycle with the heat exchanger in the sixth container and in the second cycle with a heat exchanger provided in a refrigeration load. The heat exchanger in the eighth metal-hydride container is connected in the first cycle with the heat exchanger of the refrigeration load and in the second cycle with the heat exchanger in the fifth container. These connections between corresponding heat exchangers are established by respective heat transfer medium transport tubes and three-way valves.

In this case an additional heat exchanger may be provided in the refrigeration load. The additional heat exchanger may be connected, via a control valve having adjustable opening, with the heat transfer medium transport tubes which connects the fifth and the sixth containers with the heat exchangers of the seventh and eighth containers, respectively.

With this additional heat exchanger it is possible to provide an amount of cold heat from the second metal hydride in a desired proportion to the cold heat provided from the third metal hydride so as to control the temperature of the load to a temperature somewhere between $-20°$ C. and $-50°$C.

The cold heat generating system of the invention may have the following alternative construction. Six of the above mentioned containers, first through sixth, are used so that: the first and the second containers accommodate the first metal hydrides; the third and the fourth containers accommodate the second metal hydride; and the fifth and the sixth containers accommodate the third metal hydride, such that the first container is connected with the third and the fifth containers by a first hydrogen conduit tubes and a first valve; the second container connected with the fourth and the sixth containers by a second hydrogen conduit tube and a second valve, and that the heat exchangers in the first and the second container are interchangeablly and alternately connected in the first cycle with the heat exchanger in a heating portion and in a second cycle with a first heat exchanger of a heat radiation portion via a first set of heat transfer medium transport tubes and a first set of three-way valves; the heat exchanger in the third container is connected alternately in the first cycle with a second heat exchanger of the heat radiation portion and in the second cycle with the heat exchanger in the sixth container via a second set of heat transfer medium transport tubes and a second set of three-way valves; the heat exchanger in the fourth container is connected alternately in the first cycle with the heat exchanger in the fifth container and in the second cycle with the heat exchanger of the second heat exchanger of the heat radiation portion via the second set of heat transfer medium transport tubes and a third set of three-way valves; the heat exchanger in the fifth container is connected alternately in the first cycle with the heat exchanger in the fourth container and in the second cycle with the heat exchanger of a refrigeration load, via a third set of heat transfer medium transport tubes and a fourth set of three-way valves; the heat exchanger in the sixth container is connected alternately with the heat exchanger in the third container in the first cycle and with the refrigeration load in second second cycle, via a fourth set of heat transfer medium transport tubes and a fifth set of three-way valves.

The cold heat generating system having this construction has an advantage over the example described above in that this has less components and hence simpler construction, so that the control of its operation is simpler.

In the second example above the amounts of the first, the second, and the third metal hydrides utilized may be smaller in the order mentioned such that the amount of the first metal hydride exceeds the sum of the second and the third metal hydrides.

With this distribution of the metal hydrides in the containers, the metal hydrides in the second and the third containers may be utilized as desirable and efficient sources of cold heat.

The second example above may be further provided with an additional heat exchanger for the refrigeration load, an additional heat transfer medium transport tube connected, by means of an additional control valve, with the second set of heat transfer medium transporting tube (which tube is connecting the heat exchangers in the third and the fourth containers with the heat exchangers in the fifth and the sixth containers), thereby connecting the refrigeration load with the heat exchangers in the third and the fourth containers via the control valve.

In this arrangement a portion of cold heat obtained from the second metal hydride may be fed to the refrigeration load in a controlled manner along with the cold heat obtained from the third metal hydride to thereby adjust the temperature of the refrigeration load over a wide range of temperature ranging from $-20°$C. to $-50°$C.

According to the invention, a heat driven cold heat generating system utilizing metal hydrides may be also realized in a form which includes: a multiplicity of containers each accommodating therein a metal hydride, hydrogen supply/release tube connected air-tightly with an external hydrogen conduit tube, and a heat exchanger connected air-tightly with a external heat transfer medium transport tube, wherein said heat exchangers are divided into a first and a second sets such that said heat exchangers are connected with corresponding heat exchangers in cooling portion so that in a first cycle hydrogen may be exothermically dissociated from the first set of said metal hydrides for liberation of cold heat while hydrogen is absorbed by the second set of said metal hydrides and that in a second cycle hydrogen may be dissociated from the second set of said metal hydrides for liberation of cold heat while the hydrogen is absorbed by the first set of said metal hydrides, said first and second cycles alternately repeated so as to continuously provide cold heat, characterized in that the first and the second sets of containers each accommodate two sets of metal hydrides of a first, a second, and a third kind (which are referred to simply as a first, a second, and a third metal hydride) having the lowest, second lowest, and the highest equilibrium hydrogen pressures in the order mentioned, respectively, with only the first and the second metal hydrides utilized in a normal condition such that said first metal hydride in the first set of containers is heated in a first cycle of refrigeration for dissociation of hydrogen while the hydrogen liberated from said first metal hydride is absorbed by the second metal hydrides at an ordinary temperature and at the same time in the second set hydrogen is liberated from the the second metal hydrides for generation of cold heat while the hydrogen dissociated from said second metal hydride is absorbed by the first kind of metal hydride.

The third metal hydride is additionally utilized when the radiation efficiency of the heat radiation portion lowers so that in the first set hydrogen is transferred from the first to the third metal hydride while hydrogen is transferred from the third to the first metal hydride in the second set so that the third metal hydride in said one set is cooled by the cold heat generated by the second metal hydride in said other set and the cold heat generated by the third metal hydride in said other set is extracted for refrigeration. In a second cycle of the refrigeration operation the roles of the first and second set are interchanged. By repeating this first and second cycles alternately, cold heat may be obtained continuously for refrigeration at a predetermined temperature, $-20°$ C.

say, irrespective of the radiation efficiency of the heat radiation portion.

In one aspect of the invention, the cold heat generating system mentioned directly above specifically includes: a first, a second, a third, and a fourth containers accommodating the first metal hydride having the lowest equilibrium hydrogen pressure, a fifth and a sixth containers accommodating the second metal hydride having an intermediate equilibrium hydrogen pressure, a seventh and an eighth containers accommodating the third metal hydride having the lowest equilibrium hydrogen pressure, heat exchangers in said containers, a heating portion having a heat exchanger, a heat radiation portion having a first, a second, and a third heat exchangers, a first heat transfer medium transport switching portion for interchangeablly and alternately connecting in a first and a second cycles said heat exchangers in said first and second containers with said first heat exchangers of said heating portion and said heat radiation portion, via heat transfer medium transport tubes connected with respective containers, a second heat transfer medium transport switching portion for interchangeablly and alternately connecting in the first and the second cycle, via heat transfer medium transport tubes connected with respective containers, said heat exchangers in said third and the fourth containers with said second heat exchangers of said heating portion and said heat radiation portion, said switching portion utilized at least in a case where the radiation efficiency of said heat radiation portion lowers, a third heat transfer medium transport switching portion for interchangeablly and alternately connecting in the first and the second cycles, said heat exchangers in said fifth and the sixth containers with said third heat exchanger of said heat radiation portion and a first heat transfer medium transit tube, via heat transfer medium transport tubes connected with respective containers, a fourth heat transfer medium transport switching portion for interchangeablly and alternately connecting in the first and the second cycle said heat exchangers in said seventh and the eighth containers with a second heat transfer medium transit tube and said first heat exchanger of said refrigeration load, via heat transfer medium transport tubes connected with respective containers, said switching portion used in a case where the radiation efficiency of said heat radiation portion lowers, a heat transfer medium transit tube switching portion for selectively connecting, depending on the efficiency of said heat radiation portion, said first heat transfer medium transit tube with either of said second heat transfer medium transit tube; or said second heat exchanger of said refrigeration load; a first, a second, a third, and a fourth hydrogen conduit tubes, with said first hydrogen conduit tube connecting said hydrogen supply/release tubes of said first and fifth containers and having a valve, said second hydrogen conduit tube connecting said hydrogen supply/release tubes of said second and sixth containers and also having a valve, said third hydrogen conduit tube connecting said hydrogen supply/release tubes of said third and seventh containers and having a valve, said fourth hydrogen conduit tube connecting said hydrogen supply/release tubes of said fourth and eighth containers having a valve.

In this construction, operating hydrogen pressure during cold heat generation in the cold heat generating system may be sustained at a higher level than in conventional systems even when the heat radiation efficiency of the heat radiation portion lowers, thereby allowing faster hydrogenation reactions of the metals and hence continuous provision of cold heat for refrigeration at a temperature as low as −20°C.

In another aspect of the invention a cold heat generating system specifically includes: a first and a second containers accommodating a first metal hydride having the lowest equilibrium hydrogen pressure, a third and a fourth containers accommodating a second metal hydride having an intermediate equilibrium hydrogen pressure, a fifth and a sixth containers accommodating a third metal hydride having the highest equilibrium hydrogen pressure; heat exchangers in said containers; a heating portion having a heat exchanger; a heat radiation portion having a first and a second heat exchanger; a first heat transfer medium transport switching portion for interchangeablly and alternately connecting in a first and a second cycles said heat exchangers in said first and second containers with said first heat exchangers of said heating portion and said heat radiation portion, via heat transfer medium transport tubes connected with respective containers; a second heat transfer medium transport switching portion for interchangeablly and alternately connecting in the first and the second cycle said heat exchangers in said third and the fourth containers with said second heat exchangers of said heating portion and said heat radiation portion, via heat transfer medium transport tubes connected with respective containers; a third heat transfer medium transport switching portion for interchangeablly and alternately connecting in the first and the second cycles said heat exchangers in said fifth and the sixth containers with said heat transfer medium transit tube and said first heat exchanger of said refrigeration load, via heat transfer medium transport tubes connected with respective containers, said third heat transfer medium transport switching portion utilized at least in a case where the radiation efficiency of said heat radiation portion lowers; a heat transfer medium transit tube switching portion for selectively connecting, depending on the efficiency of said heat radiation portion, said first heat transfer medium transit tube with either of said second heat transfer medium transit tube or said second heat exchanger of said refrigeration load; a first hydrogen conduit tube for connecting hydrogen supply/release tubes of said first, third, and fifth containers, said hydrogen conduit tube having a valve; and a said second hydrogen conduit tube for connecting hydrogen supply/release tubes of said second, fourth, and sixth containers, said second hydrogen conduit tube having a valve.

In this construction the cold heat generator has less components than the preceding one, so that the system has better controllability.

The amounts of the first, the second, and the third metal hydrides for this cold heat generating system are preferably decreasing in the order mentioned such that the amount of the first metal hydride exceeds the sum of the second and the third metal hydrides. This proportion of the amounts permits efficient utilization of the metal hydrides in the containers and hence provision of a highly efficient cold heat generating system.

DETAILED DESCRIPTION OF THE PREFERRED EMBODIMENT

Figure 1:
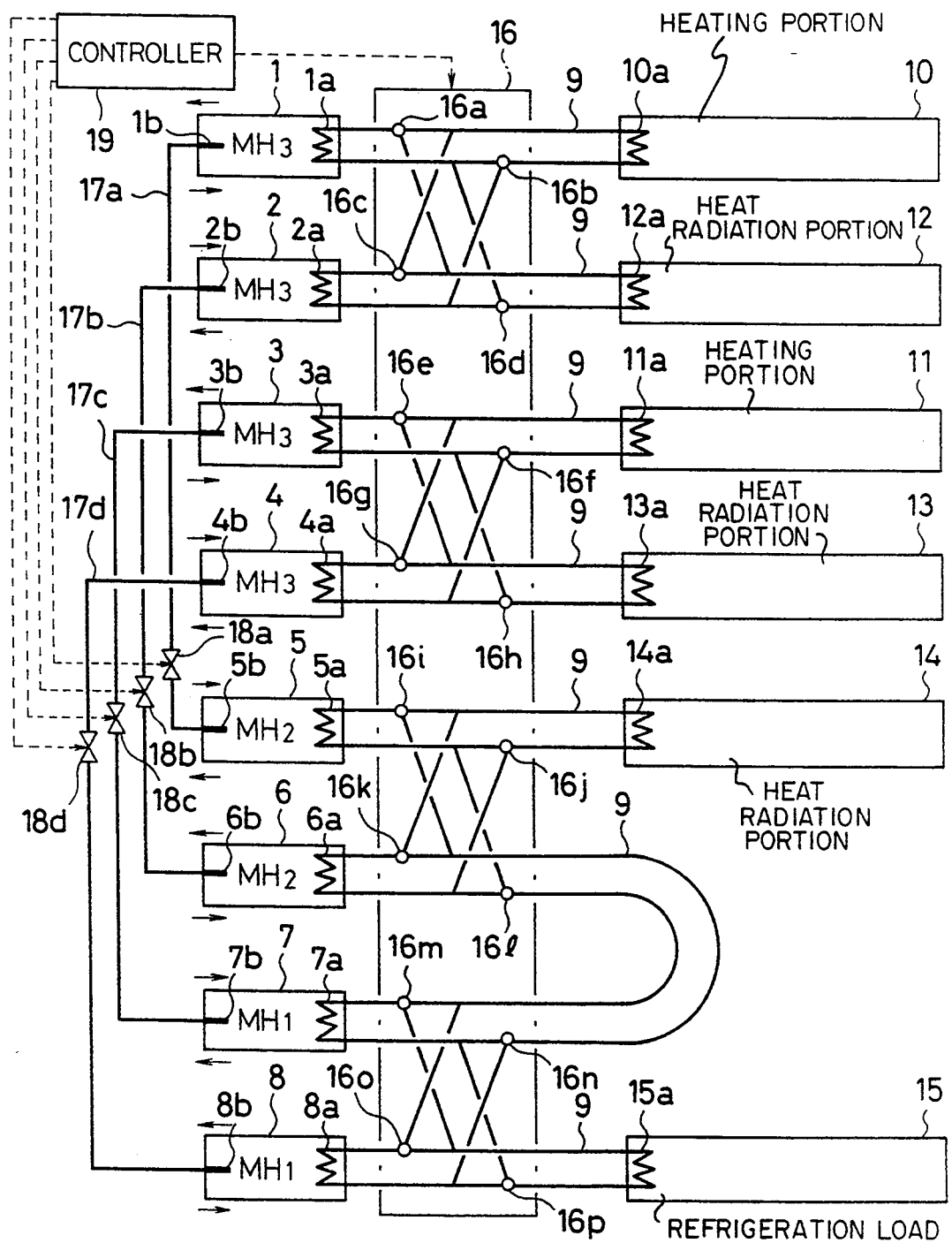
FIG. 1 illustrates the construction of a first cold heat generating system embodying the invention.

Referring now to FIG. 1 there is shown in a block diagram form a first example of a cold heat generating system according to the invention. Metal hydrides containers 1–4 contain a first metal hydride MH3, such as LaNi5 system, which has the lowest equilibrium hydrogen pressure over a range of operating temperature intended for the cold heat generating system. Metal-hydride containers 5 and 6 contain a second metal hydride MH2, such as MmNi5 system, having the second highest equilibrium hydrogen pressure over the temperature range, where Mm is a mischmetal. Metal-hydride containers 7 and 8 contain a third metal hydride MH1, such as MmNi5 system, having the highest equilibrium hydrogen pressure over the temperature range. These containers 1–8 may be any known type of metal-hydride containers which accommodate heat exchangers 1a–8a for exchanging heat to and from the metal hydrides in the respective containers and may be connected airtightly with external heat transfer medium transport tubes 9 and with external hydrogen conduit tube airtightly via hydrogen supply/release tubes 1b–8b, respectively. The hydrogen supply/release tubes 1b–8b have filters therein.

Heating portions 10 and 11 includes therein boilers and the like equipped with heat exchangers 10a and 11a, respectively. Similarly, heat radiators 12, 13, and 14 include air-cooled or water-cooled heat exchangers 12a, 13a, and 14a, respectively. A refrigeration load 15 includes a refrigeration chamber and the like having a heat exchanger 15a and a fan (not shown), in which the heat transfer medium (e.g. alcohol) liberates cold heat into the chamber.

The heat exchangers 1a–8a in the containers 1–8, respectively, are selectively connected with the heat exchangers 10a–15a of the heating portions 10 and 11, heat radiation portion 12, 13, and 14, and the refrigeration load 15 via a heat transfer medium transport switching portion 16 which includes three-way valves 16a–16p. In a first cycle of refrigeration, the heat exchangers 1a and 3a in the containers 1 and 3 are connected with the heat exchangers 10a and 11a of the heating portions 10 and 11, while the heat exchangers 2a 4a, and 5a in the containers 2, 4 and 5 are connected with the heat exchangers 12a, 13a, and 14a of the heat radiation portions 12,13, and 14, the heat exchanger 6a in the container 6 is connected with the heat exchanger 7a in the container 7; the 8a in the container 8 with the heat exchanger 15a of the refrigeration load 15, by means of respective three-way valves 16a–16p. In a second cycle of refrigeration, on the other hand, the heat exchangers 2a and 4a in the containers 2 and 4, respectively, are connected with the heat exchangers 10a and 11a in the heating portions 10 and 11, respectively; the heat exchangers 1a, 3a, and 6a in the containers 1, 3, and 6 with the heat exchangers 12a, 13a, and 14a of the heat radiation portions 12, 13, and 14, respectively; the heat exchanger 5a in the container 5 is connected with the heat exchanger 8a in the 8; the heat exchanger 7a in the 7 with the heat exchanger 15a of the refrigeration load 15, via respective three-way valves.

In addition, the hydrogen supply/release tubes 1b–4b for the containers 1–4 are connected with corresponding hydrogen supply/release tubes 5b–8b via corresponding hydrogen conduit tubes 17a–17d and corresponding valves 18a–18d.

With this arrangement, each of the three-way valves 16a–16d of the heat transfer medium transport switching portion 16 and the valves 18a–18d is controlled by a controller 19.

Figure 2:
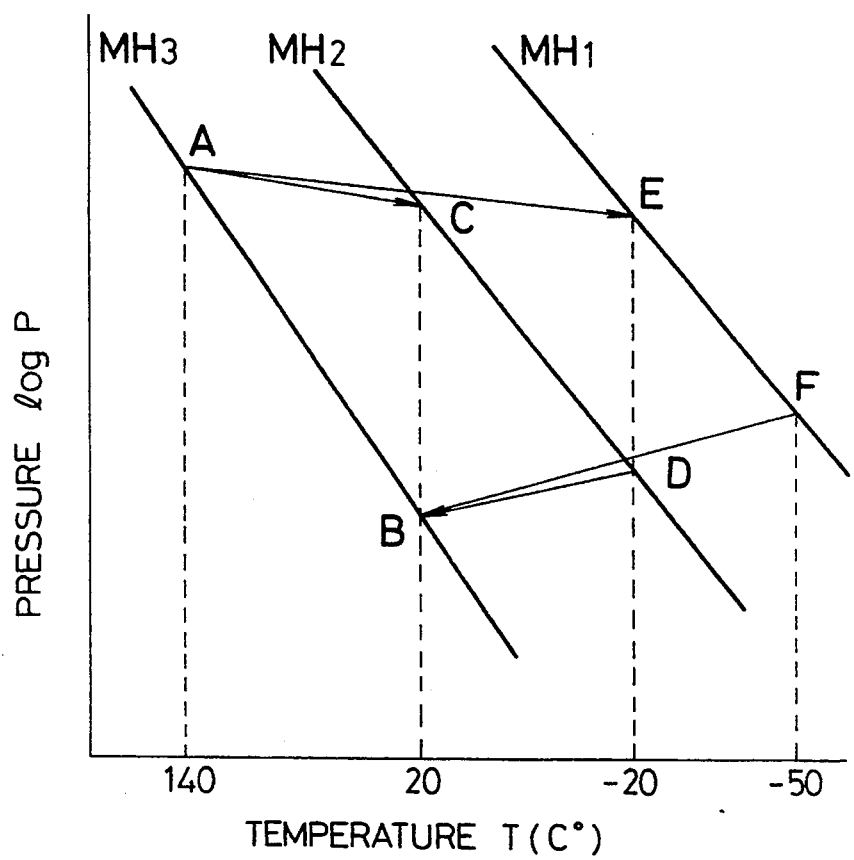
FIG. 2 shows the equilibrium hydrogen pressure as a function of temperature for an exemplary metal hydride, useful in understanding the operations of a refrigeration system in accordance with the invention.

Referring now to FIGS. 1 and 2 the operations of the above system is described below. In the first cycle of the refrigeration operation, the heat exchangers 1a, 2a, 3a, 4a, 5a 6a, 7a, and 8a are connected with the heat exchangers of the heat exchangers 10a, 12a, 13a, 14a, 7a, and 15a, respectively, by appropriately switching the three-way valves 16a–16p by the controller 19. Then, the heat exchangers 10a and 11a of the heating portions 10 and 11, respectively, are heated by a boiler. Heat transfer medium thus heated is supplied to the heat exchangers 1a and 3a in the containers 1 and 3, respectively, where the metal hydrides in the containers 1 and 3 are heated to dissociate hydrogen therefrom, rendering the temperature and the pressure in the containers 1 and 3 high as shown in FIG. 2 (state A, at 140° C.). On the other hand, the heat exchangers 12a–14a of the heat radiation portions 12–14 are cooled by air or by water so as to maintain the temperature of the heat exchangers 2a, 4a, and 5a in the containers 2, 4, and 5, respectively, at an ordinary temperature (about 20° C.). As a result of this cooling, the metal hydride MH3 in the container 2 and the metal hydride MH2 in the containers 4 and 5 are also maintained at the ordinary temperature, with the hydrogen pressure low (B) in the containers 2 and 4, which is a lower (C) than the pressure of state A in the container 5. The temperature of the metal hydride MH2 in the container 6 then becomes a little lower (−20°C.) and the pressure therein is a little higher (D) compared with state B; the thermal state of the metal hydride MH1 in the container 7 is E having a little lower in temperature and in pressure than state A; the thermal state of the metal hydride MH1 in the container 8 is represented by state F at a low temperature (−50° C.) and a higher pressure than state B.

As the valves 18a–18e are opened under this condition, the hydrogen dissociated in the containers 1 and 3 due to heating by the heating portions 10 and 11 flows into containers 5 and 7 through the hydrogen supply/release tubes 1b and 3b, the hydrogen conduit tubes 17a and 17c, and through the valves 18a and 18c, and via hydrogen supply/release tubes 5b and 7b and absorbed by the metal hydrides in the containers 5 and 7 (processes A → C and A → E in FIG. 2). The heat generated in the container 5 is discarded by heat radiation from the heat radiation portion 14. On the other hand the heat generated in the container 7 is supplied to the container 6, which heat promotes the dissociation of the hydrogen from the metal hydride MH2 in the container The hydrogen thus dissociated is supplied to the container 2 through the hydrogen supply/release tube 6b, 17b, and the 18b (process D → B). The hydrogen is exothermically absorbed by the metal hydride MH3 in the container 2 and the heat liberated from the metal hydride is radiated from the heat radiation portion 12.

The cold heat generated by the dissociation of hydrogen from the metal hydride MH2 in the container 6 is used to cool the container 7 and its content (a container and its content will be hereinafter referred to simply as container) and lower the pressure therein. On the other hand the hydrogen in the container 3 is heated to a high temperature by the heat from the heating portion 11, promoting the dissociation of the hydrogen therein and resulting in a high hydrogen pressure. The high pressure hydrogen efficiently flows from the container 3 to the container 7 (process A → E), allowing the container 7 to store a large amount of hydrogen for use in the refrigeration of a refrigeration load in the subsequent cycle.

At this point the container 4 accommodating the metal hydride MH3 has the ordinary temperature at the ordinary pressure due to the cooling by the heat radiation portion 13 while the container 8 accommodates the metal hydride MH1 storing hydrogen has a higher pressure than the container 4. Consequently, the hydrogen in the container 8 flows into the container 4 through the valve 18d (process F → B), resulting in endothermic dissociation of hydrogen from the metal hydride MH1 in the container 8 generating sufficient cold heat for refrigeration at about −50°C. The cold heat thus generated is supplied from the 8a to the refrigeration load 15 via the heat exchanger 15a, and the hydrogen generated in this cold heat generation is exothermically absorbed by the metal hydride MH3 in the container 4. The entire sequence of the processes above constitutes the first cycle of a refrigeration cycle.

Upon completion of the first cycle the valves 18a–18d are closed, the three-way valves 16a–16p are switched to connect the heat exchangers 1a, 2a, 3a, 4a, 5a, 6a, and 7a with the heat exchangers 12a, 10a, 13a, 11a, 8a, 14a, and 15a, respectively. Then the temperature in the containers 2 and 4 are raised to that of state A as shown in FIG. 2 due to the heating by the heating portions 10 and 11, respectively. The thermal states in the containers 1 and 3 become state B and the thermal state of the container 6, state C due to heat radiation by the heat radiation portions 12 and 14, respectively. The thermal states of the containers 5, 8, and 7 become states D, E, and F, respectively.

Next, as in the first cycle, the valves 18a–18d are opened to allow the hydrogen to flow from the containers 2 and 5 to the containers 6 and 8, respectively, and from the containers 5 and 7 to the containers 1 and 3, respectively. The container 8 is then cooled by the cold heat generated in the container 5, so that a great amount of hydrogen is restored in the container 8 efficiently. On the other hand, the great amount of hydrogen which has been stored in the container 7 is dissociated efficiently to produce sufficient cold heat for refrigeration at −50°C. The cold heat is provided to the refrigeration load 15. This completes the second cycle.

By alternately repeating the first and the second cycles, cold heat may be generated continuously from the containers 7 and 8 alternately to refrigerate the load at −50°C. It should be understood that, although the heating portions 10 and 11 are implemented in two independent components in the above description, they may be integrated into a single form. The same is true with the heat radiation portions 12 and 14.

Figure 3:
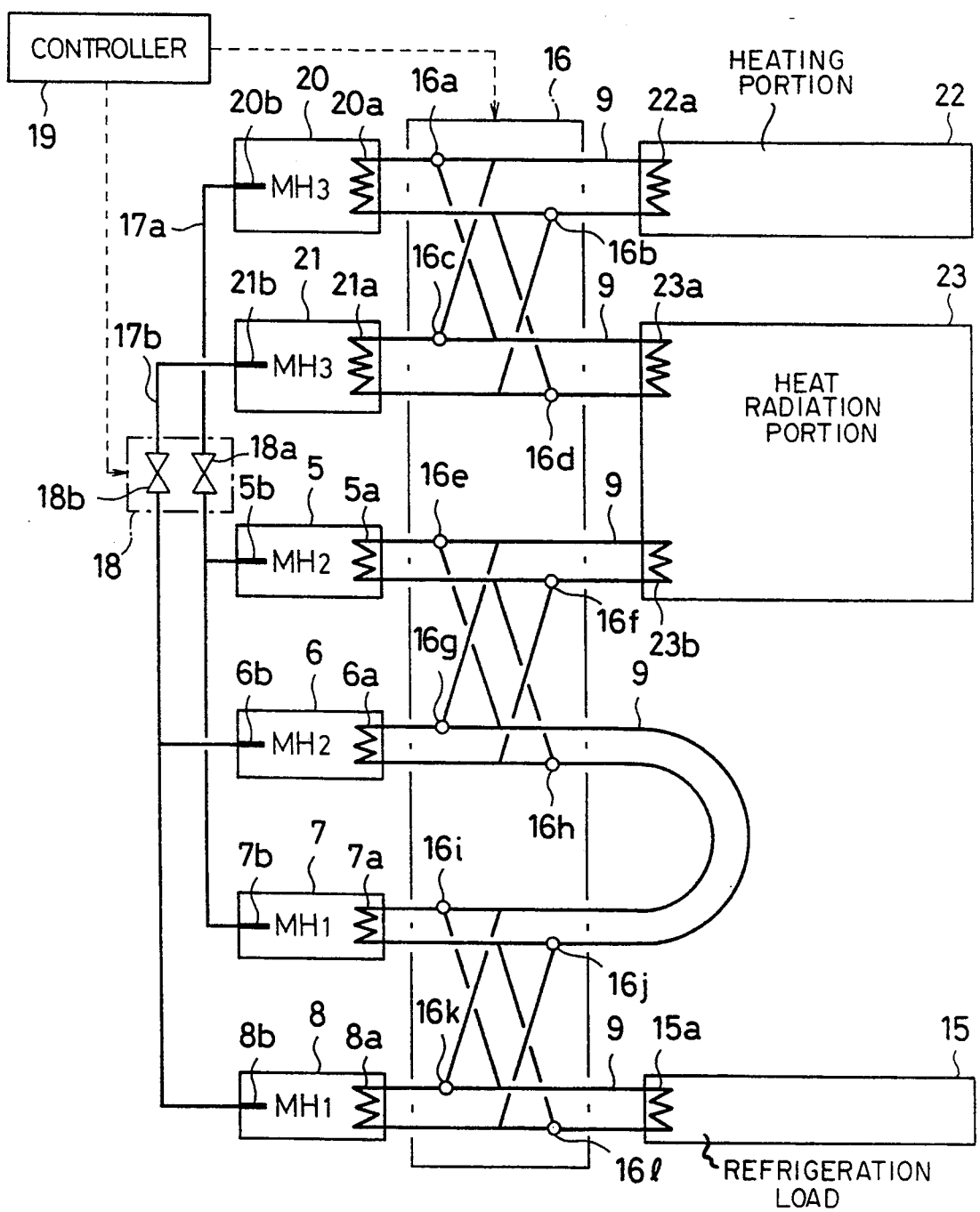
FIG. 3 illustrates the construction of a second cold heat generating system embodying the invention.

Referring now to FIGS. 2 and 3, a second example of the invention is described below.

FIG. 3 is a schematic view of the example, with like or identical components sharing the same numbers as in FIG. 1. A major difference between this example and the preceding one is that this example has less components than the preceding one. That is, the system of this example is simplified in structure compared to the preceding one, so that the system is easier to control. In order to simplify the structure, a single heat exchanger 22, a single heat radiation portion 23, and two containers 20 and 21 are implemented in place of the heating portions 10 and 11, the heat radiation portions 12, 13, and 14 the containers 1, 3, and containers 2 and 4 of FIG. 1, respectively. The containers 20 and 21 may each accommodate metal hydrides more than twice accommodated in the containers 5–8. The container 20 is connected with containers 5 and 7 via a hydrogen conduit tube 17a and an valve 18a. The container 21 is connected with containers 6 and 8 via a hydrogen conduit tube 17b and an valve 18b.

With this construction, during the first cycle of a refrigeration operation, the heat exchanger 20a of the container 20 is connected with the heat exchanger 22a of the heating portion 22; the heat exchanger 21a of the container 21 with the heat exchanger 23a of the 23; and the heat exchanger 5a in the container 5 with the heat exchanger 23b of the 23. The connections between the heat exchangers 6a and 7a, between the heat exchangers 8a and 15a are the same as in the preceding example.

In operation, the thermal state of the container 20 becomes state A (FIG. 2) due to heating by the heating portion 22; the thermal state inside the container 21, state B due to heat radiation by the heat radiation portion 23; the thermal state of the container 5, state C due to heat radiation by the heat radiation portion 23; the thermal state of the container 6, state D due to dissociation of hydrogen; the thermal state of the container 7, state E due to cooling in the container 8; the thermal state of the container 8, state F due to dissociation of hydrogen therein.

These conditions may be realized by heating the heating portion 22 by a boiler so as to heat the heat exchanger 22a, causing the heat transfer medium to be transported therefrom to the heat exchanger 20a in the container 20. This causes the metal hydride in the container 20 to be heated, liberating hydrogen until the container reaches a hot and high-pressure state A shown in FIG. 2. The dissociated hydrogen will be endothermically absorbed by the metal hydride in the container 5 (state C).

The container 21 containing the metal hydride MH3 is maintained at an ordinary temperature and an ordinary pressure due to cooling by the heat radiation portion 23. The container 6 accommodating metal hydride MH2 which stores hydrogen has the ordinary in temperature and a higher pressure than the container 21. Consequently, hydrogen flows from the container 6 to the container 21 via the hydrogen conduit tube 17b (process D → B) prompting the endothermic dissociation of hydrogen from the metal hydride in the container 6. The hydrogen thus generated is exothermically absorbed by the metal hydride MH3 in the container 21.

The pressure inside the container 7 is lowered by the cold heat from the container 6. Since the metal hydride in the container 20 is heated to the temperature corresponding to state A (FIG. 2), it dissociates hydrogen. The hydrogen in the container 20 becomes hot and highly pressurized, which will be endothermically absorbed by the metal hydride in the container 7 (state E).

The container 21 containing the metal hydride MH3 has the ordinary temperature and ordinary pressure due to heat radiation by the heat radiation portion 23. Since the pressure is higher in the container 8 containing the metal hydride MH1 than in the container 21, hydrogen absorbed in the preceding cycle now flows from the container 8 to the container 21 via the hydrogen conduit tube 17b (process F → B), so that hydrogen is liberated endothermically from the metal hydride MH1 in the container 8, generating cold heat for refrigeration of the refrigeration load at −50° C. On the other hand the hydrogen liberated in the container 8 is exothermically absorbed by the metal hydride MH3 in the container 21, which completes the first cycle of the refrigeration operation.

Upon completion of the first cycle, the valves 18a and 18b is closed, and the heat transfer medium transport switching portion 16 is switched so that the heat exchanger 20a is connected with the heat exchanger 23a; the heat exchanger 21a with the heat exchanger 22a; the heat exchanger 5a with the heat exchanger 8a; the heat exchanger 6a with the heat exchanger 23b; and the heat exchanger 7a with the heat exchanger 15a. Then, due to heating by the heating portion 22, the thermal state of the container 21 becomes state A (FIG. 2), while the thermal state of the container 20 becomes state B due to heat radiation by the heating portion 23; the container 6, state C; the container 5, state D; the container 8, state E; and the container 7, state F.

As in the first cycle, the valves 18a and 18b are opened to thereby transport hydrogen from the container 21 to the containers 6 and 8, and from the containers 5 and 7 to the container 20. This causes the container 5 to be cooled by the cold heat generated in the container 5, so that a great amount of hydrogen is efficiently stored in the containers 8. On the other hand since the great amount of hydrogen was absorbed by the metal hydride in the container 7 in the first cycle, it is now dissociated, thereby generating cold heat, which is supplied to the refrigeration load 15 for refrigeration at −50° C. This completes the second cycle.

By alternately repeating the first and the second cycles cold heat may be continuously generated from the containers 7 and 8 alternatel for refrigeration at −50° C.

In the second example described above the number of the components of the system is reduced compared with the first example, so that the operation of the system is simpler and better controlled without losing its ability to provide cold heat for refrigeration at −50°C.

There are several occasions where refrigeration temperature should be varied over a given range of temperature, for example between −50°C. and −20°C., depending on the purpose of refrigeration or the type of the refrigeration load 15. However, it is not easy to change the thermal heat transfer efficiency of the 15b for such purposes, nor desirable from ecological point of view to discard cold heat in the neighborhood of the system.

Figure 4:
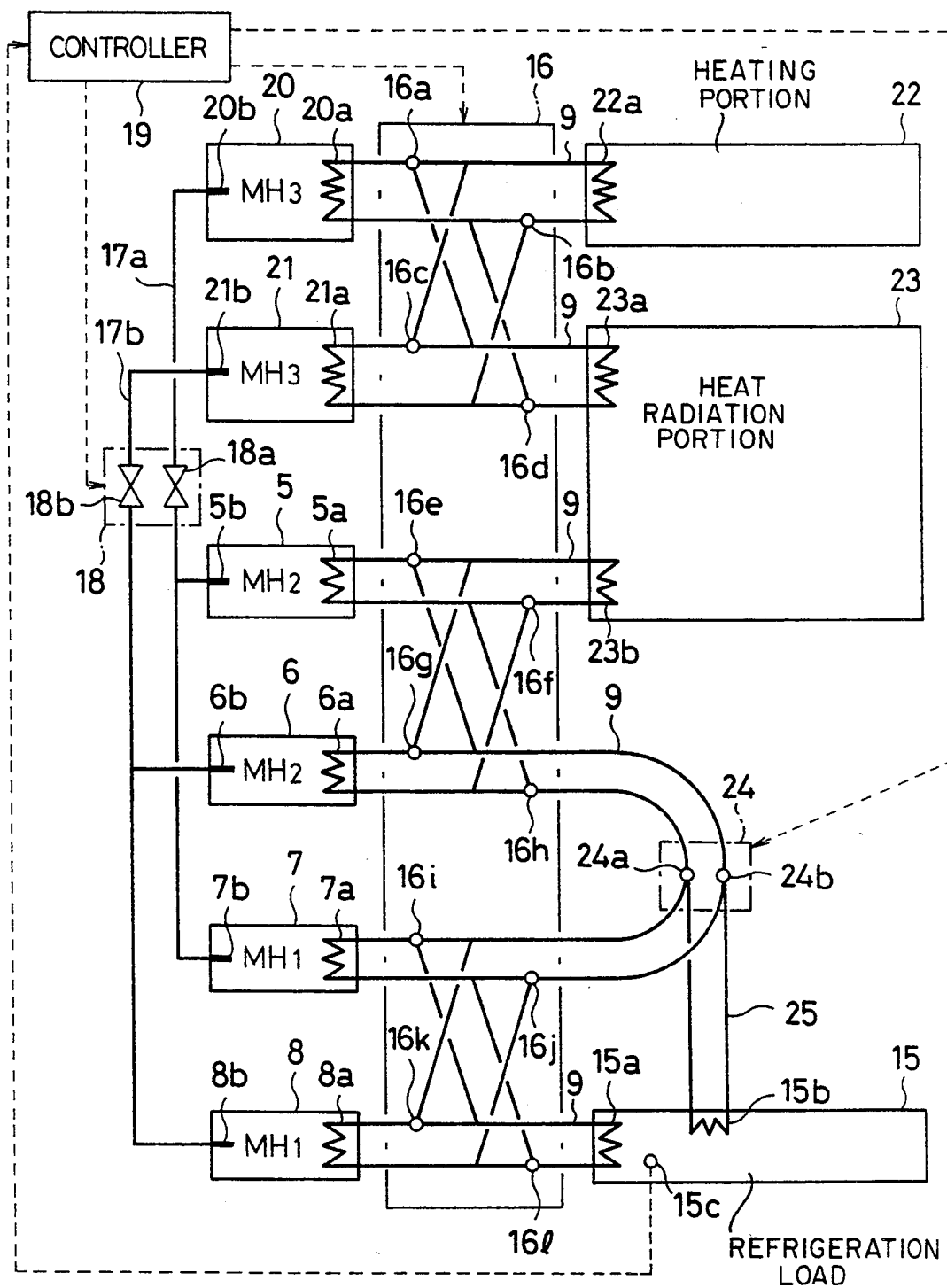
FIG. 4 illustrates the construction of a third cold heat generating system embodying the invention.

FIG. 4 illustrates a third example of the invention adapted to solve this problem. A major difference between the second and the third examples is that the heat transfer medium transport tube 9 connecting the heat exchanger 6a in the container 6 with the heat exchanger 7a in the container 7 is provided with control valves 24a and 24b, and the refrigeration load 15 is provided with an additional heat exchanger 15b which is connected with heat transfer medium transport tube 9 via the valves 24a and 24b. The refrigeration load 15 is also provided with a temperature sensor 15c for detecting cooling temperature and for sending a detection signal to a controller 19. The controller 19 is provided with means for presetting a reference temperature for the refrigeration load so that the temperature detected by the sensor 15c may be compared with the reference temperature to obtain a deviation of the load temperature. The deviation is processed by PID (Proportional, Integral, and Differential) operations to output a control signal for adjusting the opening of the valves 24a and 24b.

With this construction, during the first cycle of refrigeration the heat exchanger 20a in the container 20 is connected with the heat exchanger 22a of the heating portion 22; the 21a in the container 21 with the heat exchanger 23a of the heat radiation portion 23; the heat exchanger 5a in the container 5 with the heat exchanger 23b of the heat radiation portion 23; heat exchanger 6a with heat exchanger 7a; and heat exchanger 8a with heat exchanger 15a, as in the preceding example.

In this manner the container 20 is heated by the heating portion 22 to state A (FIG. 2); the container 21 is cooled to state B due to heat radiation by the heat radiation portion 23; the 5 cooled to state C due to heat radiation by the heat radiation portion 23; the container 6 is cooled to state D by hydrogen dissociation; the container 7 is cooled to state E by the cold heat from the container 6; and the containers 8 is cooled to state F by hydrogen dissociation.

Thus, as in the second example, during the first cycle of refrigeration, hydrogen flows from the container 20 to the containers 5 and 7, and from containers 6 and 8 to the container 21. Because of this hydrogen flow from the container 8 to the container 21 accompanying the hydrogen dissociation by the metal hydride in the container 8, cold heat is provided to the refrigeration load 15 for refrigeration at −50°C. The hydrogen transported from the container 20 into the container 7 during this cycle is absorbed by the metal hydride in the container 7 in preparation for the next cycle.

After completing the first cycle described above, the valves 18a and 18b are closed, and the heat transfer medium transport switching portion 16 is switched so as to connect the heat exchanger 20a with the heat exchanger 23a; the heat exchanger 21a with the heat exchanger 22a; the heat exchanger 5a with the heat exchanger 8a; the heat exchanger 6a with the heat exchanger 23b; and the heat exchanger 7a with the heat exchanger 15a. This switching causes the container 21 to assume state A (FIG. 2) due to heating at the heating portion 22. Also, the container 20 is brought to state B due to heat radiation by the heat radiation portion 23; the container 6 to state C; the container 5 to state D; the container 8 to state E; and the container 7 to state F.

As in the first cycle, the valves 18a and 18b are opened to thereby transporting hydrogen from the container 21 to the containers 6 and 8, and from the containers 5 and 7 to the container 20. Since the great amount of hydrogen was absorbed in the container 7 in the first cycle, it is now dissociated from the metal hydride, thereby generating cold heat, which is supplied to the refrigeration load 15 for refrigeration at −50° C. This completes the second cycle.

By alternately repeating the first and the second cycles cold heat may be continuously generated for refrigeration at −50°C., as in the second example.

In order to adjust the refrigeration temperature at the refrigeration load 15, the openings of the valves 24a and 24b are controlled so as to adjust the flow rate of the heat transfer medium from the heat transfer medium transport tube 9 to the heat exchanger 15b of the refrigeration load 15.

Since the heat exchangers 15a and 15b of the refrigeration load 15 are provided with cold heat at two different temperatures, the refrigeration load 15 is refrigerated at a temperature intermediated the two temperatures. For example, if the heat exchanger 15a is provided with cold heat for refrigeration at −50°C. and the heat exchanger 15b is provided with cold heat for refrigeration at −20°C., the refrigeration load cooled between −20°C. and −50°C. The temperature of the refrigeration load may be determined by the flow rate of the cold heat into the heat exchanger 15b. The more cold heat is supplied to the heat exchanger 15b, the closer the temperature of the load 15 approaches −20°C. As the amount of this cold heat is decreased, the temperature approaches −50°C.

In this example the refrigeration temperature of the refrigeration load 15 may be well controlled by the controller 19 as follows. The controller 19 performs PID operations on the deviation of the refrigeration temperature from the preset reference temperature, and, based on the result of the operations, controls the opening of the valves 24a and 24b so as to minimize the deviation. It is thus possible to promptly and and precisely control the refrigeration temperature of the refrigeration load 15.

It should be noted that, although the third example above is shown to have an additional control valve 24 having variable opening and an additional heat exchanger 15b added to the second example shown in FIG. 3, an alternative which is equivalent in function to the third example above may be obtained from the first example (FIG. 1) by adding thereto such valves 24a and 24b to the heat transfer medium transport tube 9 and an additional heat exchanger 15b to the refrigeration load 15.

Figure 5:
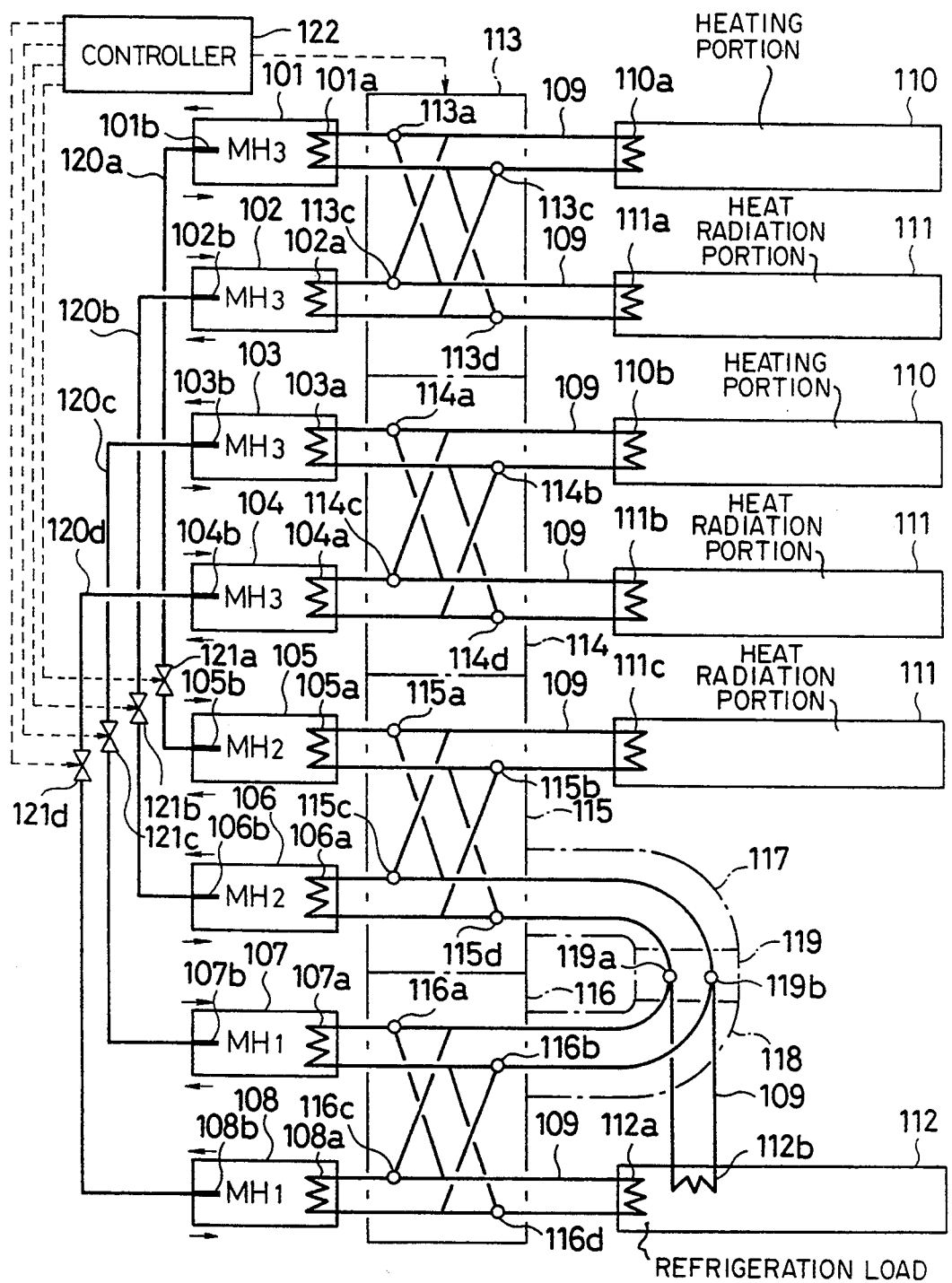
FIG. 5 illustrates the construction of a fourth cold heat generating system embodying the invention.

FIG. 5 is a block diagram for a fourth example, in which containers 101–104 accommodate a metal hydride MH3 selected from LaNi5 systems, which have the lowest equilibrium hydrogen pressure. Containers 105–106 accommodate a metal hydride MH2 selected from MmNi5 systems, which have the second lowest equilibrium hydrogen pressure, where Mm is a mischmetal. Containers 107–108 accommodate a metal hydride MH1 selected from MmNi5 systems which have the highest equilibrium hydrogen pressure.

These containers 101–108 may be any known type of metal-hydride containers which have heat exchangers 101a–108a for transferring heat to and from metal hydrides in the respective containers and may be connected with heat transfer medium transport tubes 109 air-tightly and with hydrogen conduit tubes air-tightly via hydrogen supply/release tubes 101b–108b provided for respective containers. The hydrogen supply/release tubes 101b–108b have filters therein. It should be understood that the term "heat transfer medium" refers to a medium for transferring and transporting heat, irrespective of its temperature.

Heating portions 110 include therein boilers and the like having heat exchangers 110a and 110b, respectively. Similarly, heat radiation portion 111 includes air-cooled or water-cooled heat exchangers 111a, 111b, 111c. A refrigeration load 112 includes a refrigeration chamber and the like having heat exchangers 112a, 112b, 112c and a fan (not shown), in which the heat transfer medium (e.g. alcohol) liberates cold heat from heat exchangers 112a, 112b into the chamber.

The heat exchangers 101a–102a in the containers 101–102, respectively, are interchangeablly connected with the heat exchangers 110a and 111a of the heating portion 110 and heat radiation portion 111, respectively, by means of heat transfer medium transport tubes 109 via a heat transfer medium transport switching portion 113 which includes three-way valves 113a–113d. The heat exchangers 103a–104a in the containers 103–104, respectively, are interchangeablly connected with the heat exchangers 110b and 111b of the heating portion 110 and the heat radiation portion 111, respectively, by means of heat transfer medium transport tubes 109 via a heat transfer medium transport switching portion 114 which includes three-way valves 114a–114d. The heat exchangers 105a–106a in the containers 105–106, respectively, are interchangeablly connected with the heat exchanger 111c of the heat radiation portion 111 and a heat transfer medium transit tube 117 by means of heat transfer medium transport tubes 109 via a heat transfer medium transport switching portion 115 which includes three-way valves 115a–115d. The heat exchangers 107a–108a in the containers 107–108, respectively, are interchangeablly connected with the heat transfer medium transit tube 118 and a heat exchanger 112a of the refrigeration lead 112 by means of heat transfer medium transport tubes 109 via a heat transfer medium transport switching portion 115 which includes three-way valves 115a–116d.

The heat transfer medium transit tube 117 is selectively connected with either one of the heat transfer medium transit tube 118 or the heat transfer medium transport tubes 109 leading to the refrigeration load 112 via a heat transfer medium transit tube switching portion 119 which includes three-way valves 119a and 119b. The heat transfer medium transit tube 117 is connected with the heat exchanger 112b of the refrigeration load 112 when the heat radiation portion 111 functions normally to radiate heat, but the heat transfer medium transit tube 117 is connected with the heat transfer medium transit tube 118 when the heat radiation efficiency of the heat radiation portion 111 lowers undesirably.

On the other hand the hydrogen supply/release tubes 101b–104b installed in the containers 101–104, respectively, are connected with the hydrogen supply/release tubes 104b–108b provided for the containers 104–108 via respective hydrogen conduit tubes hydrogen conduit tubes 120a–120d and valves 121a–121d, respectively.

In this construction the three-way valves of the heat transfer medium transport switching portions 113–116 and the valves 121a–121d are controlled appropriately by a controller 122. On the other hand the three-way valves 119a and 119b of the heat transfer medium transit tube switching portion 119 may be controlled manually or by the controller 122.

Figure 6:
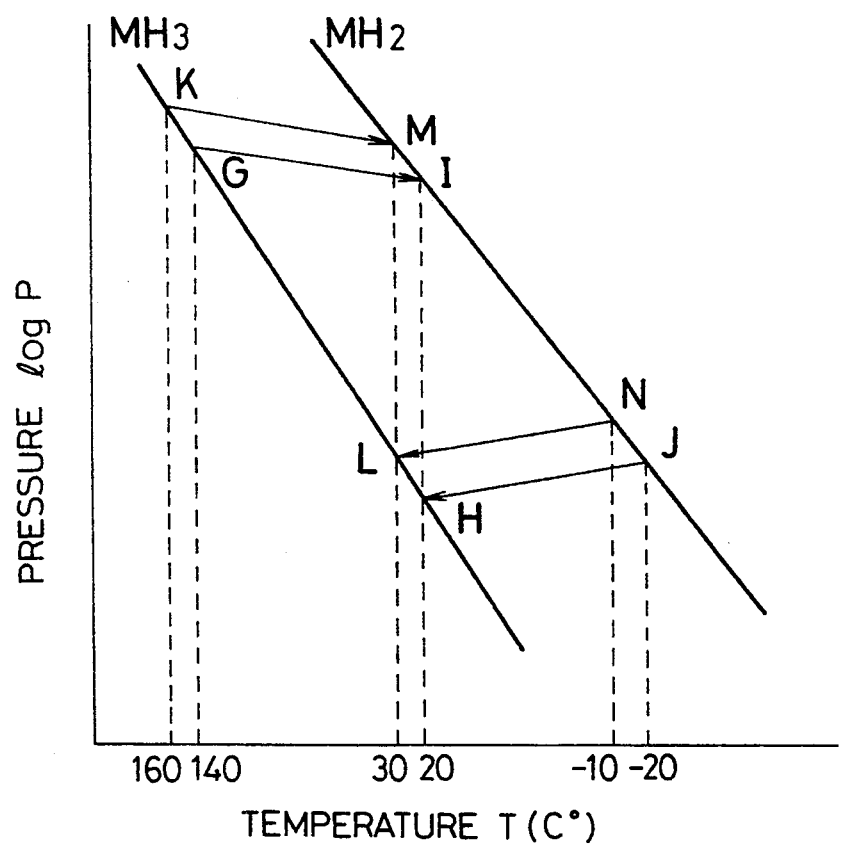
FIGS. 6 and 7 show respectively the equilibrium hydrogen pressures as functions of temperature for different metal hydrides, useful in understanding the operations of a refrigeration system in accordance with the invention.
Figure 7:
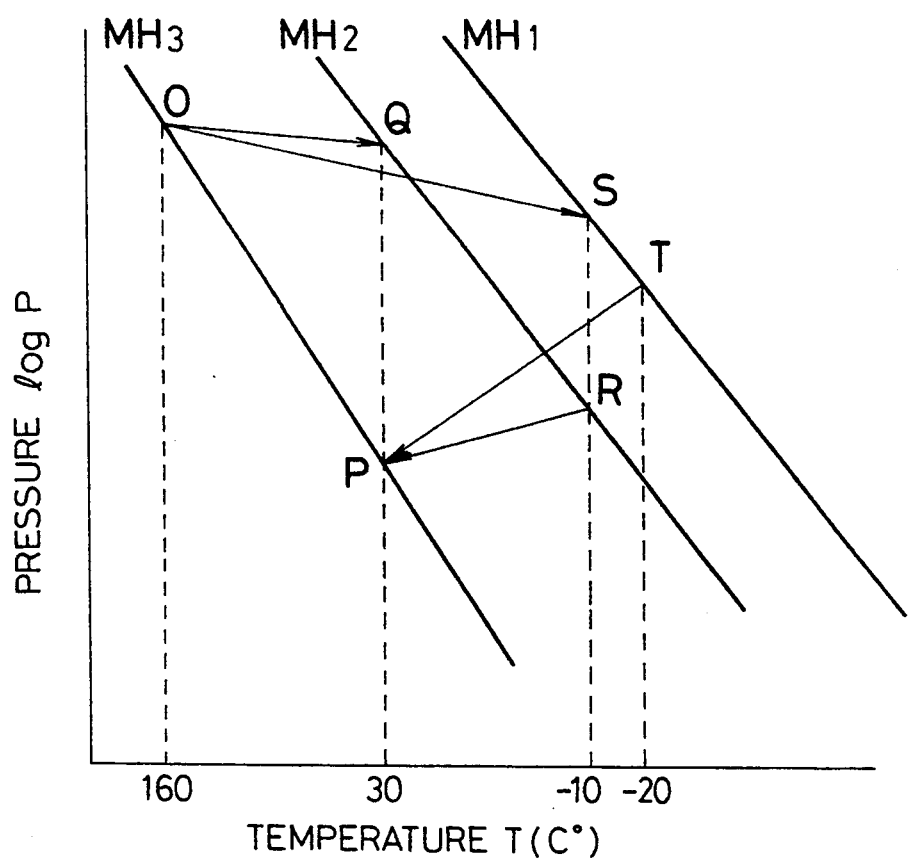

Referring now to FIGS. 5–7, the operations of the fourth example are described. First, when the heat radiation efficiency of the heat radiation portion 111 is normal, the metal hydride MH1 in the containers 107 and 108 having the highest equilibrium pressure is not utilized but only the metal hydrides MH2 and MH3 having the second highest and the lowest equilibrium hydrogen pressures, respectively, in the containers 101–106 are used. To do so, the heat transfer medium transit tube 119 is switched so as to connect the heat transfer medium transit tube 117 with the heat exchanger 112b of the refrigeration load 112 via the heat transfer medium transport tubes 109, with the heat exchanger 112a of the refrigeration load 112 being switched off from the heat transfer medium transport switching portion 118. It should be noted that the containers 103 and 104 connected with the containers 107 and 108 via the hydrogen conduit tubes 120c and 120d and valves 121c and 121d are not required for refrigeration, nor are required the heat exchangers 110b and the 111b of the heating portion 110 and the heat radiation portion 111, respectively, so that the valves 121c and 121d and the heat transfer medium transport switching portions 114 and 116 need not be controlled. That is, when the heat radiation efficiency is normal, only the containers 101, 102, 105, and 106 and their associated components are required for extraction of cold heat for refrigeration at −20°C.

In a first cycle of refrigeration under such normal operating condition as above, the controller 122 controls the three-way valves 113a–113d and 115a–115d of the heat transfer medium transport switching portions 113 and 115, respectively, so as to connect the heat exchanger 101a with the heat exchanger 110a; the heat exchanger 112a with heat exchanger 111a; and the heat exchanger 115a with the heat exchanger 111c. Also, the heat exchanger 106a is connected with the heat exchanger 112b of the heat radiation portion 112 via the heat transfer medium transit tube 117, the heat transfer medium transit tube switching portion 119, and the heat transfer medium transport tube 109.

Next, the heat exchanger 110a of the heating portion 110 is heated by a boiler to provide the heat exchanger 101a in the container 101 with heat transferred by the heat transfer medium therein, so that hydrogen is dissociated from the metal hydride in the container 101. The container 101 then assumes a hot (140° C.) and highly pressurized state G shown in FIG. 6. On the other hand the heat exchangers 111a and 111c of the heat radiation portion 111 is air-cooled or water-cooled to maintain the heat exchangers 102a and 105a, and hence the metal hydrides MH3 and MH2 also, in the containers 102 and 105 at ordinary temperature (20° C.) to thereby maintaining in the container 102 at state J (having an ordinary temperature and a low pressure), the 105 at state H having ordinary temperature and a pressure lower than that of state A. The container 106 accommodating the metal hydride MH2 now assumes state I having a low temperature (−20° C.) and a pressure which is lower than that of state J.

Under this condition, if the valves 121a and 121b are opened, the hydrogen dissociated by the heating of the heating portion 110 and contained in the container 101 flows into the container 105 via the hydrogen supply/release tube 101b, the hydrogen conduit tube 120a, and the valve 121a, and is exothermically absorbed by the metal hydride in the container 105 (process G → H). The heat generated in the container 105 is radiated from the heat exchanger 111c of the heat radiation portion 111.

At the same time, the hydrogen in the container 106 flows into the container 102 via the hydrogen conduit tubes 120b, and the valve 121b, and exothermically absorbed by the metal hydride in the container 102 (process I → J). The cold heat generated by the hydrogen dissociation from the metal hydride in the container 106 is delivered to the refrigeration load 112 through the heat transfer medium transit tube 117 and the heat transfer medium transit tube switching portion 119 for refrigeration at −20° C. This completes the first cycle.

Upon the completion of the first cycle, the valves 121a and 121b are closed, and the heat transfer medium transport switching portions 113 and 115 are switched so as to connect the heat exchanger 101a with the heat exchanger 111a; the heat exchanger 102a with the heat exchanger 110a; the heat exchanger 105a with the heat exchanger 112b; and the heat exchanger 106a with the heat exchanger 111c. Then the container 102 assumes the state G (FIG. 6) due to heating of the heating portion 110, and the container 106 assumes state H due to heat radiation by the 111c at the heat radiation portion 111. Also the containers 105 and 101 assume state I and state J, respectively.

Following the processes mentioned above, the valves 121a and 121b are opened, as in the first cycle, to allow the hydrogen to flow from the container 106 to the container 102, and from the container 105 to the container 101, generating cold heat in the container 105 to be used for refrigeration at −20° C. in the refrigeration load 112. This completes the second cycle.

By alternately repeating such first and the second cycles described above, cold heat is generated continuously from the containers 105 and 106 in turn for refrigeration at −20° C. in the refrigeration load 112.

If, however, the heat radiation efficiency of the heat radiation portion 111 lowers, and if the the temperature of the heat radiation portion becomes, for example 30° C., then the cold heat available by the dissociation of hydrogen becomes sufficient only for refrigeration at −10° C., thereby failing to provide a desirable amount of cold heat. This may be the case even if the metal hydride MH3 is heated to 160° C. to transfer hydrogen from the metal hydride MH3 to the metal hydride MH2 (K → L) so that hydrogen is transported from metal hydride MH2 to the metal hydride MH3 in the process M → N. In order to eliminate such problem, the invention utilizes three kinds of metal hydrides MH1, MH2, and MH3 together as the heat radiation efficiency lowers. In this case all the components shown in FIG. 5 are utilized in refrigeration operation. In the first cycle of the refrigeration, the controller 122 controls the three-way valves 113a–116a, 113b–116b, 113c–116c, and 113d–116d, so as to connect the heat exchanger 101a with the heat exchanger 110a; the heat exchanger 102a with the heat exchanger 111a; the heat exchanger 103a with the heat exchanger 110b; the heat exchanger 104a with the heat exchanger 111b; and the heat exchanger 105a with the heat exchanger 111c. The heat exchanger 106a is then connected with the heat exchanger 107a in the container 107 via the heat transfer medium transit tubes 117 and 118 and the heat transfer medium transit tube switching portion 119, while the heat exchanger 108a in the container 108 is connected with the heat exchanger 112a of the refrigeration load 112.

Next, the 110a and 110b of the heating portions 110 are heated by the boiler stronger than in normal conditions, which results in heating of the heat transfer medium which in turn heat the exchangers 101a and 103a in the containers 101 and 103, respectively. The metal hydrides in the containers 101 and 103 are heated to dissociate hydrogen. The hydrogen inside the containers 101 and 103 acquires a high temperature (160° C.)

and a high pressure. On the other hand, the heat exchangers 111a–111c of the heat radiation portion 111 are air-cooled or water-cooled. However, the heat exchangers 102a, 104a, and 105a in the containers 102, 104 and 105, respectively, have a higher temperature (30° C.) than ordinary temperature and the heat radiation efficiency is low. Thus, the metal hydride MH3 and the metal hydride MH2 in the containers 102 and 104 are initially at a state corresponding to state P (FIG. 7) representing a higher temperature state. The metal hydride MH2 in the 105 also has ordinary temperature (state O) but a slightly lower pressure (state Q) than state O. The container 106 has a slightly low temperature (−10° C.) and a higher pressure (corresponding to state R) than state P. The container 107 accommodating metal hydride metal hydride MH1 has a slightly lower temperature (corresponding to state S) than state O, and the container 108 accommodating metal hydride MH1 has low temperature (−20° C.) and a higher pressure (corresponding to state T) than state P.

Under this condition, if the valves 121a–121d are opened, the hydrogen dissociated by the heating of the heating portions 110 and stored in the containers 101 and 103 flows into the containers 105 and 107 via respective hydrogen supply/release tubes 101b and 103b, the hydrogen conduit tubes 120a and 120c, the valves 121a and 121c, and the heat exchangers 105b and 107b, and exothermically absorbed by the metal hydrides in the containers 105 and 107 (processes A→ Q and O → S, respectively). The heat generated in the container 105 is radiated from the heat radiation portion 111, while the heat generated in the container 107 is provided to the container 106, which heat promotes the dissociation of hydrogen from the metal hydride MH2 in the container 106. The hydrogen thus dissociated is provided to the container 102 (process R → P) via the heat exchanger 106b, the hydrogen conduit tubes 120b, and the valve 121b, and exothermically absorbed by the metal hydride MH3. The heat generated by the dissociation of hydrogen in the container 102 is radiated from the heat radiation portion 111.

The cold heat generated by the dissociation of hydrogen from the metal hydride MH2 in the container 106 serves to cool the container 107 and lowers the pressure therein. On the other hand, the container 103 is heated by the heat from the heat exchanger 110b of the heating portion 110 to a high temperature, so that the dissociation of hydrogen is promoted in the container 103, rendering the pressure therein very high. The liberated hydrogen flows from the container 103 into the container 107 (process O → S), where it is stored for the subsequent refrigeration cycle.

The container 104 that contains metal hydride MH3 has a temperature slightly higher than ordinary temperature due to heating by the heat radiation portion 111, but has a low pressure. The container 108 accommodating metal hydride MH1 that has absorbed hydrogen has a very high pressure. Hence, hydrogen flows from the container 108 to the container 104 via the hydrogen conduit tube 120d (process T → P), accompanying dissociation of hydrogen from the metal hydride MH1 in the container 108 and generation of cold heat for refrigeration at −20° C. through endothermic absorption of hydrogen. The cold heat thus generated is provided to the refrigeration load 112 via the heat exchangers 108a and the 112a. At the same time the hydrogen generated in the dissociation is exothermically absorbed by the metal hydride MH3 in the container 104. This completes the first cycle of the refrigeration.

Upon the completion of the first cycle described above, the valves 121a–121d are closed, and the three-way valves 113a–116d are switched so as to connect the heat exchanger 101a with the heat exchanger 112a, the heat exchanger 102a with the heat exchanger 110a, the heat exchanger 103a with the heat exchanger 111b, the heat exchanger 104a with the heat exchanger 110b, the heat exchanger 105a with the heat exchanger 108a, the heat exchanger 106a with the heat exchanger 111c, and the heat exchanger 107a with the heat exchanger 112a. Then, due to heating of the heating portion 110, the containers 102 and 104 assume state O. The containers 101 and 103 assumes the state; P while the container 106 assumes the state Q due to heat radiation from the heat radiation portion 111. The containers 105, 108, and 107 assume the states R, S, and T, respectively.

Next, as in the first cycle, the valves 121a–121d are opened to allow hydrogen to flow from the containers 102 and 104 to the containers 106 and 108, respectively, as well as from the containers 105 and 107 to the containers 101 and 103, respectively. The container 108 is then cooled by the cold heat generated in the container 105, thereby hydrogen is efficiently recovered in the container 108. On the other hand the container 107 stores; a great amount of hydrogen absorbed in the preceding cycle, which is now efficiently dissociated to generate cold heat, which is supplied to the refrigeration load 112 for refrigeration at −20° C. This completes the second cycle.

By alternately repeating the first and the second cycle described above it is possible to continuously provide, from the containers 107 and 108 alternately, the refrigeration load 112 with cold heat for refrigeration at −20° C., even when the heat radiation efficiency of the heat radiation portion 111 is decreased.

As described above, when the temperature of the heating radiation portion 111 becomes high and its radiation efficiency is low, the heat transfer medium transit tube switching portion 119 is switched so as to couple the containers 107 and 108 accommodating the metal hydride MH1 having the highest equilibrium hydrogen pressure with the containers 105 and 106 accommodating the metal hydride MH2 having the second highest equilibrium pressure, so that the cold heat generated in the container 105 or 106 is utilized to cool the containers 107 or 108. Thus, by alternately repeating the first and the second cycle described above, it is possible to continuously provide from the containers 107 and 108 alternately the refrigeration load 112 with cold heat for refrigeration at −20° C., even when the heat radiation efficiency of the heat radiation portion 111 is decreased.

Figure 8:
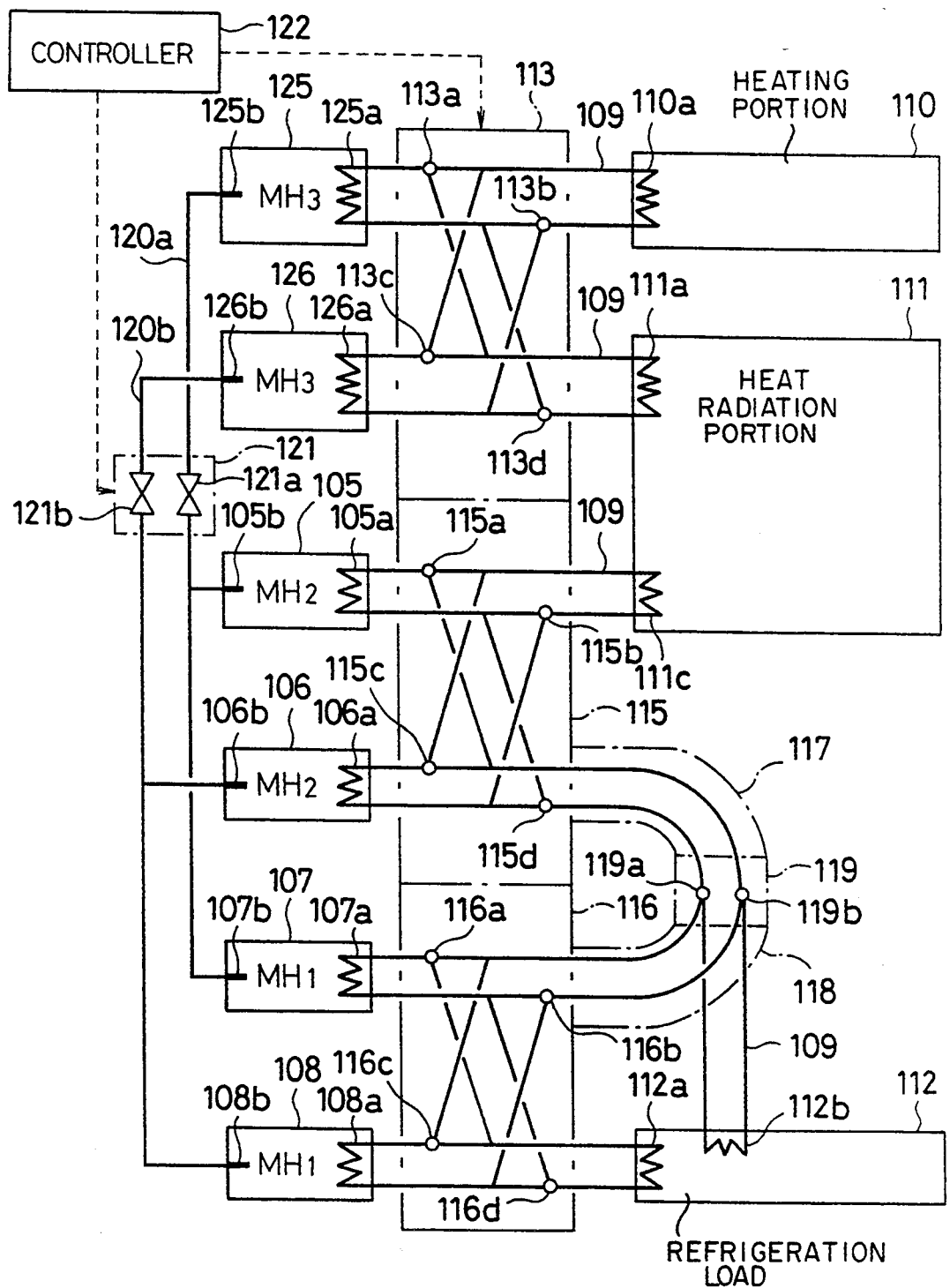
FIG. 8 is illustrates the construction of a fifth cold heat generating system embodying the invention.

Referring to the FIGS. 6, 7, and 8, a sixth example of the invention is described below. Like or identical components share the same numbers throughout these figures. A major difference between the example shown in FIG. 8 and the one shown in FIG. 5 is that the present example has less components and a simpler construction, and hence better controllability. For this reason the containers 101 and 103, and the containers 102 and 104 of FIG. 5 are replaced by single metal-hydride containers 125 and 126, respectively.

It should be noted that the amounts of the first, second, and the third metal hydrides MH3, MH2, and MH1, respectively, are such that the amount of the first kind, metal hydride MH3, is equal to or greater than the total amount of the second and the third metal hydrides, MH2 and MH1, respectively. Thus, the metal-hydride containers 125 and 126 contain metal hydride MH3 at least twice the amounts of the respective metal hydrides contained in the containers 105–108. The metal-hydride container 125 is connected with the containers 105 and 107 via a hydrogen conduit tube 120a and an valve 121a. The container metal-hydride container 126 is connected with the containers 106 and 108 via a hydrogen conduit tube 120b and an valve 121b.

With the above construction, when the heat radiation portion 111 has normal heat radiation efficiency, the containers 107 and 108 containing the metal hydride MH1 having the highest equilibrium hydrogen equilibrium pressure are not used, but only the metal-hydride containers 125, 126, 105, and 106 containing the metal hydrides MH2 and MH3 having the second and the third highest equilibrium hydrogen pressures, respectively are used for refrigeration. To do so, the heat transfer medium transit tube switching portion 119 is switched so as to connect the 112b of the refrigeration load 112 via the heat transfer medium transport tubes 109, with the heat exchanger 112a of the refrigeration load 112 switched off from the heat transfer medium transport switching portion 116. Since the containers 107 and 108 are not needed then, the heat transfer medium transport switching portion 116 need not be controlled.

In a first cycle of refrigeration where the heat radiation efficiency is normal, at least three-way valves 113a–113d, 115a–115d of the heat transfer medium transport switching portions 113 and 115, respectively, are controlled by the controller 122 so as to connect the heat exchanger 125a in the container 125 with the heat exchanger 110a, the heat exchanger 126a with the heat exchanger 111a, the heat exchanger 105a with the heat exchanger 111c, and the heat exchanger 106a with the heat exchanger 112b, as in the preceding example.

Thus, because of heating of the heating portion 110, the metal-hydride container 125 assumes state G (FIG. G). The container 105 assumes state H due to heat radiation by the heat radiation portion 111. The containers 106 and the 126 assume state I and J, respectively.

As the valves 121a and 121b are opened under this condition, hydrogen is transported from the container 125 to the container 105 and from the container 106 to the metal-hydride container 126, so that the states of the containers changes from G to H and from I to J, respectively, as shown in FIG. 6 by the arrows G → H and I → J. In this case, cold heat is generated in the container 106 by the dissociation of hydrogen from the metal hydride MH2, which heat is furnished to the refrigeration load 112 for refrigeration at −20° C. via the heat transfer medium transit tube 117, the heat transfer medium transit tube switching portion 119, the heat transfer medium transport tubes 109 and the heat exchanger 112b. This completes the first cycle.

Upon the completion of the first cycle, the valves 121a and 121b are closed and the heat transfer medium transport switching portions 113 and 115 are switched so as to bring the metal-hydride container 126 to state G by heat radiation from the heating portion 110, the container 106 to state H, the container 105 to state I, and the metal-hydride container 125 to state J by the heat radiation from the heat exchanger 111c of the heat radiation portion 111.

Next, as in the first cycle, by opening the valves 121a and 121b, hydrogen is transported from the metal-hydride container 126 to the container 106 and from the container 105 to the container 125. Then, cold heat is generated in the container 105 which may be utilized for refrigeration of the load 112 at −20° C. This completes the second cycle.

As described above, by alternately repeating the first and the second cycles cold heat may be continuously supplied from the container 105 and 106 alternately for refrigeration of the load 112 at −20° C.

When the heat radiation from the heat radiation exchangers lowers, all of the three kinds of metal hydrides, MH1, MH2, and the MH3 shown in FIG. 5 are used. In the first cycle of refrigeration, the controller 122 switches the three-way valves 113a–116a, 114a–114d, 115a–115d, and 116a–116d of the heat transfer medium transport switching portions 113, 114, 115, and 116, respectively, so as to connect the heat exchanger 125a in the container 125 with the heat exchanger 110a, the heat exchanger 126a with the heat exchanger 111a, and the heat exchanger 105a with the heat exchanger 111c. Under this condition the heat exchanger 106a is connected with the heat exchanger 107a in the container 107, and the heat exchanger 108a of the container 108 with the heat exchanger 112a of the refrigeration load 112 via the heat transfer medium transit tubes 117 and 118 and heat transfer medium transit tube switching portion 119, as in the preceding example.

Next, by heating the heat exchanger 110a of the heating portion 110 stronger than in normal condition, the metal-hydride container 125 assumes state O. The metal-hydride container 126 assumes state P and the container 105 assumes state Q by heat radiation from the heat radiation portion 111. The container 107 is cooled by the cold heat from the container 106 and assumes state S. The container 108 assumes state T due to hydrogen dissociation taking place therein.

Thus, by opening the valves 121a and 121b, hydrogen flows from the metal-hydride container 125 to the containers 105 and 107, which corresponds to a change in state from O to Q, and from O to S as shown by corresponding arrows in FIG. 7. At the same time, hydrogen flows from the containers 106 and 108 to the container 126, resulting in changes T → P and R → P as depicted in FIG. 7, and accompanying generation of cold heat in the container 108 for refrigeration at −20° C. That is, cold heat for refrigeration at −20° C. may be obtained by exothermic absorption of hydrogen in the container 107 even when the cold heat generated in the container 106 amounts to a level which is sufficient only for refrigeration at −10° C. due to low heat radiation efficiency of the heat radiation portion 111. This completes the first cycle.

Upon completion of the first cycle, the valves 121a and 121b are closed and the heat transfer medium transport switching portions 113, 115, and 116 are switched so as to connect the heat exchanger 125a with the heat exchanger 111a, the heat exchanger 126a with the heat exchanger 110a, the heat exchanger 105a with the heat exchanger 108a, the heat exchanger 106a with the heat exchanger 111c, and the heat exchanger 107a with the 112a. Then the metal-hydride container 126 assumes state O due to heating in the heating portion 110, and the metal-hydride container 125 and the container 106 assumes states P and Q, respectively, due to heat radiation from the heat radiation portion 111 The containers 105, 108, and 107 assume states R, S, and T, respectively.

Next, as the valves 121a and 121b are opened as in the first cycle, hydrogen is transported from the metal-hydride container 126 to the containers 106 and 108, and from the containers 105 and 107 to the container 125. Then the container 108 is cooled by the cold heat generated in the container 105, so that hydrogen is efficiently recovered therein. On the other hand, since the container 107 stores a great amount of hydrogen absorbed in the preceding cycle, it is now efficiently dissociated, generating cold heat, which is supplied to the controller 122 for refrigeration at −20° C. This completes the second cycle.

Thus, in this example, by alternately repeating the first and the second cycles it is possible to continuously supply cold heat from the containers 107 and 108 alternately for refrigeration of load 112 at −20° C. even when the radiation temperature of the heat radiation portion 111 does not lower.

Further, this example has an advantage that the system has less components and hence better controllability.

We claim:

1. A refrigeration system utilizing hydrogen and metal hydrides, said system including: two sets of multiple metal-hydride containers each accommodating therein hydrogen, a metal hydride, a hydrogen supply/release tube for connecting each said metal-hydride container with an external hydrogen conduit tube, and a heat exchanger connected with an external heat transfer medium transport tube, heat radiation means, heating means, and cooling means, such that said heat exchangers in the first and the second sets of metal-hydride containers are interchangeably and alternately connected with said heating means and cooling means in a first and a second cycle of refrigeration, respectively, so that in said first cycle of refrigeration hydrogen is dissociated in one set of said first and the second sets of metal-hydride containers to absorb heat while hydrogen is absorbed in another one of said first and the second sets of metal-hydride containers to recover hydrogen dissociated in a current cycle, whereas in said second cycle of refrigeration hydrogen is absorbed in said one set of said two sets of metal-hydride containers to recover the hydrogen which was dissociated therefrom in said first cycle while hydrogen is dissociated from said metal hydrides in said another set of metal-hydride containers to remove heat, said first and second cycles being alternately repeated to continuously absorb heat from a refrigeration load, said system comprising:

each of said two sets of metal-hydride containers comprises first, second, and third kinds of metal hydrides respectively having different equilibrium hydrogen pressures wherein said first kind of metal hydride has a lowest equilibrium hydrogen pressure, said second kind of metal hydride has a second lowest equilibrium hydrogen pressure, and said third kind of metal hydride has a highest equilibrium hydrogen pressure;

in said first cycle, said first metal-hydride in said one of said two sets of containers is heated by said heating means to dissociate hydrogen which is then supplied to and absorbed by said second and third metal-hydrides, while in said another set of metal-hydride containers hydrogen is dissociated from said second and third metal-hydrides to remove heat with said dissociated hydrogen transferred to and absorbed by said first metal-hydride in the same set, said heat absorbed by said second metal-hydride utilized to cool said third metal hydride in said one set and said heat absorbed by said third metal hydride utilized for refrigeration of said refrigeration load; and in said second cycle, roles of said first and second sets are interchanged with respect to said first cycle.

2. A cold heat generating system according to claim 1, wherein said system is provided with a first through an eighth metal-hydride containers with the first through fourth metal-hydride containers accommodating said first metal hydrides, the fifth and sixth metal-hydride containers accommodating said second metal hydrides, and the seventh and eighth metal-hydride containers accommodating said third metal hydride, with the first metal-hydride container connected with the fifth metal-hydride container by means of said hydrogen conduit tube having a valve via said supply/release tubes provided therefor; the second metal-hydride container connected with the sixth metal-hydride container by means of said hydrogen conduit tube having a valve via said supply/release tubes provided therefor; the third metal-hydride container connected with the seventh metal-hydride container by means of said hydrogen conduit tube having a valve via said supply/release tubes provided therefor; and the fourth metal-hydride container connected with the fifth metal-hydride container by means of said hydrogen conduit tube having a valve via said supply/release tubes provided therefor;

said heat exchangers provided in said first and third metal-hydride containers are connected in said first cycle, via three-way valves, with a first and a second ones of said heating portions, respectively, and in a second cycle with a first and a second ones of said heat radiation portions, respectively;

said heat exchangers in said second and fourth metal-hydride containers are connected in said first cycle, via three-way valves, with said first and second heat radiation portions and in the second cycle with said first and second heating portions, respectively;

said heat exchanger provided in said fifth metal-hydride container is connected in the first cycle with a third one of said heat radiation portions and in the second cycle with said heat exchanger in said eighth metal-hydride container;

said heat exchanger in said sixth metal-hydride container is connected in said first cycle with said heat exchanger in said seventh metal-hydride container and in said second cycle with said heat exchanger of said third heat radiation portion;

said heat exchanger in the seventh metal-hydride container is connected in said first cycle with said heat exchanger in said sixth metal-hydride container and in the second cycle with a heat exchanger provided in a refrigeration load;

said heat exchanger in said eighth metal-hydride container is connected in said first cycle with said heat exchanger in said refrigeration load and in the second cycle with said heat exchanger in said fifth metal-hydride container;

said heat exchangers are provided by associated heat transfer medium transport tubes and three-way valves.

3. A cold heat generating system according to claim 2, further comprising:
- an additional heat exchanger in said refrigeration load;
- a heat transfer medium transport tube connected with said heat transfer medium transport tube which connects said sixth and seventh metal-hydride containers;
- an additional control valve provided at the connection of said additional heat transfer medium transport tube and said heat transfer medium transport tube connecting said sixth and seventh metal-hydride containers, said additional control valve having adjustable opening for controlling the flow rate of cold heat from said heat transfer medium transport tube connecting said sixth and seventh metal-hydride containers to said additional heat exchanger.

4. A refrigeration system utilizing hydrogen and metal hydrides, said system including: a first set and a second set of multiple metal-hydride containers each accommodating therein hydrogen, a metal hydride, a hydrogen supply/release tube for connecting each of said metal-hydride containers with a hydrogen conduit tube, and a heat exchanger connected with a heat transfer medium transport tube, a heat radiation means, a heating means, and a cooling means, such that said heat exchangers in first set and in said second set of metal-hydride containers are interchangeably and alternately connected with said heating means and said cooling means in a first cycle and a second cycle of refrigeration, respectively, so that in said first cycle of refrigeration hydrogen is dissociated in one set of said first set and said second set of said metal-hydride containers to remove heat while hydrogen is absorbed in another set of said first set and said second set of metal-hydride containers to recover hydrogen dissociated in a current cycle, and in said second cycle of refrigeration hydrogen is absorbed in said one set of metal-hydride containers to recover hydrogen while hydrogen is dissociated from said metal hydrides in said other set of metal-hydride containers to remove heat, said first and second cycles being alternately repeated to continuously absorb heat from a refrigeration load, said system comprising:
- said first and second sets together comprise a total of six metal-hydride containers, which are respectively first, second, third, fourth, fifth, and sixth metal-hydride containers, with first and second metal-hydride containers accommodating said first metal hydrides and said third and fourth metal-hydride containers each accommodating said second metal hydride, and said fifth and sixth metal-hydride containers accommodating said third metal-hydride;
- said first metal-hydride container is connected with said third and firth metal-hydride containers by a first hydrogen conduit tube and a first valve; said second metal-hydride containers by a second hydrogen conduit tube and a second valve;
- said heat exchangers in said first and said second metal-hydride containers are interchangeably and alternately connected in said first cycle with a heat exchanger of said heating means and in said second cycle with a first heat exchanger having said radiation means;
- said heat exchanger in said third metal-hydride container is connected alternately in said first cycle with a second heat exchanger of said heat radiation means and in said second cycle with said heat exchanger in said sixth metal-hydride container;
- said heat exchanger in said fourth metal-hydride container is connected alternately in said first cycle with said heat exchanger in said fifth metal-hydride container and in said second cycle with said heat exchanger having said heat radiation means;
- said heat exchanger in said fifth metal-hydride container is connected alternately in said first cycle with said heat exchanger in said fourth metal-hydride container and in said second cycle with said heat exchanger of said refrigeration load;
- said heat exchanger in said sixth metal-hydride container is connected alternately with said heat exchanger in said third metal-hydride container in said first cycle and with said refrigeration load in said second cycle,
- a plurality of heat transfer medium transport tubes and three-way valves for respectively connecting said heat exchangers.

5. A cold heat generating system according to claim 4, wherein the amounts of said first, second, and third metal hydrides are the greatest, the second greatest, and the least, respectively, in the order mentioned such that said first metal hydride exceeds in amount the sum of said second and third metal hydrides.

6. A cold heat generating system according to claim 4, further comprising:
- an additional heat exchanger in said refrigeration load;
- a heat transfer medium transport tube connected with said heat transfer medium transport tube which connects said fourth and fifth metal-hydride containers;
- an additional control valve provided at the connection of said additional heat transfer medium transport tube and said heat transfer medium transport tube connecting said fourth and fifth metal-hydride containers, said additional control valve having adjustable opening for controlling the flow rate of cold heat from said heat transfer medium transport tube connecting said fourth and fifth metal-hydride containers to said additional heat exchanger.

7. A refrigeration system utilizing hydrogen and metal hydrides, said system including: a first set and a second set of multiple metal-hydride containers each accommodating therein hydrogen, a metal hydride, a hydrogen supply/release tube for connecting each said metal-hydride container with an external hydrogen conduit tube, and a heat exchanger connected with an external heat transfer medium transport tube, heat radiation means, heating means, and cooling means, such that said heat exchangers in said first set and in said second set of metal-hydride containers are interchangeably and alternately connected with said heating means and cooling means in a first cycle of refrigeration and in a second cycle of refrigeration, respectively, so that in said first cycle of refrigeration hydrogen is dissociated in one set of said first set and said second set of said metal-hydride containers to remove heat while hydrogen is absorbed in another set of said first set and said second set metal-hydride containers to recover hydrogen dissociated in a current cycle from a different metal hydride, and in said second cycle of refrigeration hydrogen is absorbed in said one set of said first set and said second set of metal-hydride containers to recover said hydrogen while hydrogen is dissociated from said metal hydrides in said another set of said first set and said second set of metal-hydride containers to remove heat, said first cycle and said second cycle being alternately repeated to continuously absorb heat from a refrigeration load, said system comprising:
  each of said two sets of metal-hydride containers accommodates metal hydrides of first, second, and third kinds of metal hydrides respectively having different equilibrium hydrogen pressures wherein said first kind of metal hydride has a lowest equilibrium hydrogen pressure, said second kind of metal hydride has a second lowest equilibrium hydrogen pressure, and said third kind of metal hydride has a highest equilibrium hydrogen pressure;
  only said first and second metal hydrides are utilized in a normal condition such that in said first cycle of refrigeration and first metal hydride in said one of said first set and said second set of metal-hydride containers is heated to cause dissociation of hydrogen which is then absorbed by said second metal hydride, while simultaneously in said another of said first set and said second set of metal-hydride containers hydrogen is dissociated from said second metal hydride for removal of heat and is absorbed by said first metal hydride in said another of said first set and said second set, and in said second cycle of the refrigeration the roles of said one and the other sets of metal-hydride containers are interchanged;
  said third metal hydride is additionally utilized when the radiation efficiency of said heat radiation means lowers so that in said one of said two sets of metal-hydride containers hydrogen is transferred from said first to said third metal hydrides while in said other of said two sets of metal-hydride containers hydrogen is transferred from said third to said first metal hydride containers so that said third metal hydride in said one set is cooled by said heat absorbed by said second metal hydride in said other set and said heat absorbed by said third metal hydride in said other set is extracted for refrigeration, and in said second cycle of the refrigeration the roles of said one and said other of said two sets of metal hydride containers are interchanged; and that
  said first cycle and said second cycle being alternately repeated to continuously remove heat from said refrigeration load, for refrigeration irrespective of a radiation efficiency of said heat radiation means.

8. A cold heat generating system according to claim characterized in that said system comprises:
  a first, a second, a third, and a fourth metal-hydride containers accommodating the first metal hydride having the lowest equilibrium hydrogen pressure;
  a fifth and a sixth metal-hydride containers accommodating the second metal hydride having an intermediate equilibrium hydrogen pressure;
  a seventh and an eighth metal-hydride containers accommodating the third metal hydride having the lowest equilibrium hydrogen pressure;
  heat exchangers one in each of said metal-hydride containers;
  a heating portion having a heat exchanger;
  a heat radiation portion having a first, a second, and a third heat exchangers;
  a first heat transfer medium transport switching portion for interchangeably and alternately connecting in a first and a second cycles of refrigeration said heat exchangers in one of said two sets of metal-hydride containers with said first heat exchangers of said heating portion and with said heat radiation portion, via heat transfer medium transport tubes and three-way valves;
  a second heat transfer medium transport switching portion for interchangeably and alternately connecting in said first and second cycles, via heat transfer medium transport tubes connected with respective metal-hydride containers, said heat exchangers in said third and the fourth metal-hydride containers with said second heat exchangers of said heating portion and said heat radiation portion, said switching portion utilized at least in a case where the radiation efficiency of said heat radiation portion lowers;
  a third heat transfer medium transport switching portion for interchangeably and alternately connecting in said first and second cycles, said heat exchangers in said fifth and the sixth metal-hydride containers with said third heat exchanger of said heat radiation portion and a first heat transfer medium transit tube, via heat transfer medium transport tubes and three-way valves;
  a fourth heat transfer medium transport switching portion for interchangeably and alternately connecting in said first and second cycles said heat exchangers in said seventh and the eighth metal-hydride containers with a second heat transfer medium transit tube and said first heat exchanger of said refrigeration load, via heat transfer medium transport tubes and three-way valves, said switching portion used at least in a case where the radiation efficiency of said heat radiation portion lowers;
  a fifth heat transfer medium transit tube switching portion for selectively connecting, depending on the efficiency of said heat radiation portion, said first heat transfer medium transit tube with either of said second heat transfer medium transit tube or said second heat exchanger of said refrigeration load;
  a first, a second, a third, and a fourth hydrogen conduit tubes, with said first hydrogen conduit tube connecting said hydrogen supply/release tubes of said first and fifth metal-hydride containers and having a valve, said second hydrogen conduit tube connecting said hydrogen supply/release tubes of said second and sixth metal-hydride containers and also having a valve, said third hydrogen conduit tube connecting said hydrogen supply/release tubes of said third and seventh metal-hydride containers and having a valve, said fourth hydrogen conduit tube connecting said hydrogen supply/release tubes of said fourth and eighth metal-hydride containers having a valve.

9. A cold heat generating system according to claim 7, characterized in that said system comprises:
  a first and a second metal-hydride containers accommodating a first metal hydride having the lowest equilibrium hydrogen pressure;
  a third and a fourth metal-hydride containers accommodating a second metal hydride having an intermediate equilibrium hydrogen pressure;
  a fifth and a sixth metal-hydride containers accommodating a third metal hydride having the highest equilibrium hydrogen pressure;

heat exchangers in said metal-hydride containers; a heating portion having a heat exchanger;

a heat radiation portion having a first and a second heat exchanger;

a first heat transfer medium transport switching portion for interchangeably and alternately connecting in a first and a second cycles said heat exchangers in said first and second metal-hydride containers with said first heat exchangers of said heating portion and said heat radiation portion, via heat transfer medium transport tubes connected with respective metal-hydride containers; a second heat transfer medium transport switching portion for interchangeably and alternately connecting in the first and the second cycle said heat exchangers in said third and the fourth metal-hydride containers with said second heat exchangers of said heating portion and said heat radiation portion, via heat transfer medium transport tubes connected with respective metal-hydride containers;

a third heat transfer medium transport switching portion for interchangeably and alternately connecting in the first and, the second cycles said heat exchangers in said fifth and the sixth metal-hydride containers with said heat transfer medium transit tube and said first heat exchanger of said refrigeration load, via heat transfer medium transport tubes connected with respective metal-hydride containers, said third heat transfer medium transport switching portion utilized at least in a case where the radiation efficiency of said heat radiation portion lowers;

a heat transfer medium transit tube switching portion for selectively connecting, depending on the efficiency of said heat radiation portion, said first heat transfer medium transit tube with either of said second heat transfer medium transit tube or said second heat exchanger of said refrigeration load;

a first hydrogen conduit tube for connecting hydrogen supply/release tubes of said first, third, and fifth metal-hydride containers, said hydrogen conduit tube having a valve; and a said second hydrogen conduit tube for connecting hydrogen supply/release tubes of said second, fourth, and sixth metal-hydride containers, said second hydrogen conduit tube having a valve.

10. A cold heat generating system according to claim 7, wherein the amounts of said first, second, and third metal hydrides are the greatest, the second greatest, and the least, respectively, in the order mentioned such that said first metal hydride exceeds in amount the sum of said second and third metal hydrides.

* * * * *